(12) United States Patent
Liu

(10) Patent No.: US 11,731,015 B2
(45) Date of Patent: Aug. 22, 2023

(54) METHOD FOR MANUFACTURING GOLF PUTTER CLUBHEAD, GOLF PUTTER CLUB HEAD, AND GOLF PUTTER

(71) Applicant: Tat Wong, Hong Kong (CN)

(72) Inventor: Yi Liu, Shenzhen (CN)

(73) Assignee: Tat Wong, Kowloon (CN)

( * ) Notice: Subject to any disclaimer, the term of this patent is extended or adjusted under 35 U.S.C. 154(b) by 53 days.

(21) Appl. No.: 17/314,117

(22) Filed: May 7, 2021

(65) Prior Publication Data

US 2022/0288469 A1 Sep. 15, 2022

(30) Foreign Application Priority Data

Mar. 15, 2021 (CN) .......................... 202110274516.5

(51) Int. Cl.
*A63B 53/04* (2015.01)
*B33Y 80/00* (2015.01)
*A63B 53/00* (2015.01)
*C21D 1/34* (2006.01)
*C21D 9/00* (2006.01)

(52) U.S. Cl.
CPC ........ *A63B 53/0487* (2013.01); *A63B 53/007* (2013.01); *B33Y 80/00* (2014.12); *C21D 1/34* (2013.01); *C21D 9/0068* (2013.01)

(58) Field of Classification Search
CPC .............................................. A63B 53/04–065
See application file for complete search history.

(56) References Cited

U.S. PATENT DOCUMENTS

| | | | | |
|---|---|---|---|---|
| 3,557,336 A | * | 1/1971 | Bullough | C21D 9/62 219/71 |
| 4,167,427 A | * | 9/1979 | Ueda | C22F 1/183 148/669 |
| 4,267,211 A | * | 5/1981 | Yajima | C04B 35/645 427/388.1 |
| 4,482,398 A | * | 11/1984 | Eylon | C22F 1/183 148/501 |
| 5,551,999 A | * | 9/1996 | Gostic | C21D 1/785 148/675 |
| 5,935,018 A | * | 8/1999 | Takeda | A63B 53/04 473/324 |

(Continued)

*Primary Examiner* — Eugene L Kim
*Assistant Examiner* — Matthew B Stanczak
(74) *Attorney, Agent, or Firm* — Weitzman Law Offices, LLC

(57) ABSTRACT

Disclosed are a method for manufacturing a golf putter clubhead, a golf putter clubhead, and a golf putter. The steps of the method for manufacturing the golf putter clubhead include: obtaining or preparing a clubhead body, where the clubhead body includes a clubface, the clubface includes a toe portion, a middle portion, and a heel portion, the toe portion and the heel portion are respectively located at two ends of the clubface, and the middle portion is located between the toe portion and the heel portion; performing stiffening treatment on the clubface; and performing softening treatment on the middle portion after the stiffening treatment. After stiffening treatment is performed on the entire clubhead body, the softening treatment is performed on the middle portion of the clubface, so that stiffness of the toe portion and the heel portion is greater than that of the middle portion of the clubface.

10 Claims, 5 Drawing Sheets

(56) References Cited

U.S. PATENT DOCUMENTS

| | | | | |
|---|---|---|---|---|
| 6,814,820 B2* | 11/2004 | Ozbaysal | C22F 1/183 | 420/419 |
| 6,841,014 B2* | 1/2005 | Huang | A63B 53/0475 | 148/648 |
| 8,500,573 B2* | 8/2013 | Rick | A63B 53/047 | 473/349 |
| 9,427,636 B1* | 8/2016 | Ivanova | A63B 53/047 | |
| 10,722,768 B1* | 7/2020 | Yi | A63B 53/0425 | |
| 10,835,789 B1* | 11/2020 | DeMille | A63B 53/0487 | |
| 11,208,701 B2* | 12/2021 | Wu | C21D 1/42 | |
| 2001/0014627 A1* | 8/2001 | Harada | A63B 60/00 | 473/324 |
| 2002/0022534 A1* | 2/2002 | Kobayashi | A63B 53/0466 | 473/324 |
| 2002/0160852 A1* | 10/2002 | Chen | C22C 38/44 | 473/324 |
| 2003/0008726 A1* | 1/2003 | Sano | A63B 53/04 | 473/345 |
| 2003/0109328 A1* | 6/2003 | Chen | B21J 5/02 | 473/342 |
| 2004/0092334 A1* | 5/2004 | Yamamoto | A63B 60/00 | 148/542 |
| 2005/0009629 A1* | 1/2005 | Chao | A63B 53/0466 | 473/345 |
| 2005/0277487 A1* | 12/2005 | Takeda | A63B 53/0466 | 473/345 |
| 2006/0137784 A1* | 6/2006 | Lo | C21D 1/09 | 148/714 |
| 2006/0154745 A1* | 7/2006 | Johnson | A63B 60/00 | 473/345 |
| 2008/0017281 A1* | 1/2008 | Lin | C22F 3/00 | 148/525 |
| 2009/0312118 A1* | 12/2009 | Deshmukh | A63B 53/047 | 473/345 |
| 2010/0331108 A1* | 12/2010 | Rick | A63B 53/047 | 473/349 |
| 2011/0073222 A1* | 3/2011 | Strandell | C21D 1/18 | 148/575 |
| 2012/0186060 A1* | 7/2012 | Su | A63B 53/047 | 29/592 |
| 2015/0080150 A1* | 3/2015 | Chang | A63B 53/04 | 473/349 |
| 2015/0232976 A1* | 8/2015 | Simone | C22C 14/00 | 148/525 |
| 2015/0321053 A1* | 11/2015 | Deshmukh | A63B 53/0466 | 29/428 |
| 2017/0145550 A1* | 5/2017 | Simone | B23K 10/02 | |
| 2018/0051354 A1* | 2/2018 | Wu | A63B 53/02 | |
| 2018/0209010 A1* | 7/2018 | Simone | C21D 10/00 | |
| 2018/0327872 A1* | 11/2018 | Svensson | C21D 11/00 | |
| 2021/0077868 A1* | 3/2021 | Simone | A63B 53/0445 | |
| 2022/0118326 A1* | 4/2022 | Halberg | A63B 60/52 | |

* cited by examiner

METHOD FOR MANUFACTURING GOLF PUTTER CLUBHEAD, GOLF PUTTER CLUB HEAD, AND GOLF PUTTER

CROSS-REFERENCE TO RELATED APPLICATION

This application claims priority to Chinese patent application No. 202110274516.5, filed Mar. 15, 2021, the content of which is incorporated herein by reference in its entirety.

TECHNICAL FIELD

The present disclosure relates to the field of sports equipment technologies, and more particularly, to a method for manufacturing a golf putter clubhead, a golf putter clubhead, and a golf putter.

BACKGROUND

In golf, players first use a wood club and an iron club to hit a golf ball to the putting green, and then hole out by using a putter. To smoothly hole out to enjoy the fun of sports and win the game, the putter must have good stability and high fault tolerance to achieve precise ball control.

A moving direction and a moving distance of the ball vary greatly with a ball hitting position on a clubface of a common putter clubhead. Therefore, the method for manufacturing a golf putter clubhead needs to be improved to reduce the difference in moving directions and moving distances incurred from different ball hitting positions on the clubface, so as to improve stability and fault tolerance.

SUMMARY OF INVENTION

The present disclosure aims to solve at least one of technical problems in the prior art. In view of this, the present disclosure provides a method for manufacturing a golf putter clubhead to manufacture a golf putter clubhead with relatively high hitting stability and high fault tolerance.

Embodiments of a first aspect of the present disclosure provide a method for manufacturing a golf putter clubhead, including: obtaining or preparing a clubhead body, where the clubhead body includes a clubface, the clubface includes a toe portion, a middle portion, and a heel portion, the toe portion and the heel portion are respectively located at two ends of the clubface, and the middle portion is located between the toe portion and the heel portion; performing stiffening treatment on the clubface; and performing softening treatment on the middle portion after the stiffening treatment.

The method for manufacturing the golf putter clubhead provided in the embodiments of the first aspect of the present disclosure has at least the following beneficial effects: After stiffening treatment is performed on the entire clubhead body, softening treatment is performed on the middle portion of the clubface, so that stiffness of the toe portion and the heel portion is greater than that of the middle portion on the clubface. When the toe portion or the heel portion of the clubface hits a ball, the ball tends to move towards the middle portion of the clubface. In this case, not all of a driving force over the ball comes from a rebound force generated by an interaction at a contact moment, but comes more from a force generated by swinging the club. Therefore, a moving direction and a moving distance become more stable when the ball is putted, thereby improving stability and fault tolerance for ball hitting.

In some embodiments of the present disclosure, the step of performing softening treatment on the middle portion includes: setting a plurality of softening areas; determining required stiffness for each of the plurality of softening areas, so that stiffness gradually increases from the center to the periphery on the clubface; setting a softening treatment parameter for each of the plurality of softening areas based on the required stiffness; and performing softening treatment on each of the plurality of softening areas based on the softening treatment parameter for each of the plurality of softening areas.

In some embodiments of the present disclosure, a temperature for the stiffening treatment is 860° C. to 880° C., and a time for the stiffening treatment is 90 minutes.

In some embodiments of the present disclosure, a method for the softening treatment is as follows: heating the middle portion by using a high-frequency wave.

In some embodiments of the present disclosure, a heating temperature of the high-frequency wave is 1040° C. to 1060° C., and a heating time of the high-frequency wave is 4 to 6 seconds.

In some embodiments of the present disclosure, the method for manufacturing the golf putter clubhead further includes: grinding the clubface.

In some embodiments of the present disclosure, the method for manufacturing the golf putter clubhead further includes: performing electroplating treatment on a surface of the clubhead body.

In some embodiments of the present disclosure, the clubhead body is produced by using a 3D printing method.

Embodiments of a second aspect of the present disclosure provide a golf putter clubhead, which is manufactured by using the method for manufacturing the golf putter clubhead according to any one of the foregoing embodiments.

The golf putter clubhead provided in the embodiments of the second aspect of the present disclosure has at least the following beneficial effects: The golf putter clubhead manufactured by using the method for manufacturing the golf putter clubhead provided in the embodiments of the first aspect of the present disclosure enables a moving direction and a moving distance to become more stable when a ball is putted, thereby improving stability and fault tolerance for ball hitting.

Embodiments of a third aspect of the present disclosure provide a golf putter, including: the golf putter clubhead according to any one of the foregoing embodiments; and a shaft connected to the golf putter clubhead.

The golf putter clubhead provided in the embodiments of the third aspect of the present disclosure has at least the following beneficial effects: The golf putter manufactured by using the golf putter clubhead that can improve stability and fault tolerance for ball hitting enables improved stability and fault tolerance for ball hitting for the entire golf putter.

Some additional aspects and advantages of the present disclosure are provided in the following descriptions, are clear in the following descriptions, or are understandable through practice of the present disclosure.

BRIEF DESCRIPTION OF THE DRAWINGS

The following further describes the present disclosure with reference to the accompanying drawings and embodiments.

Figure 1:
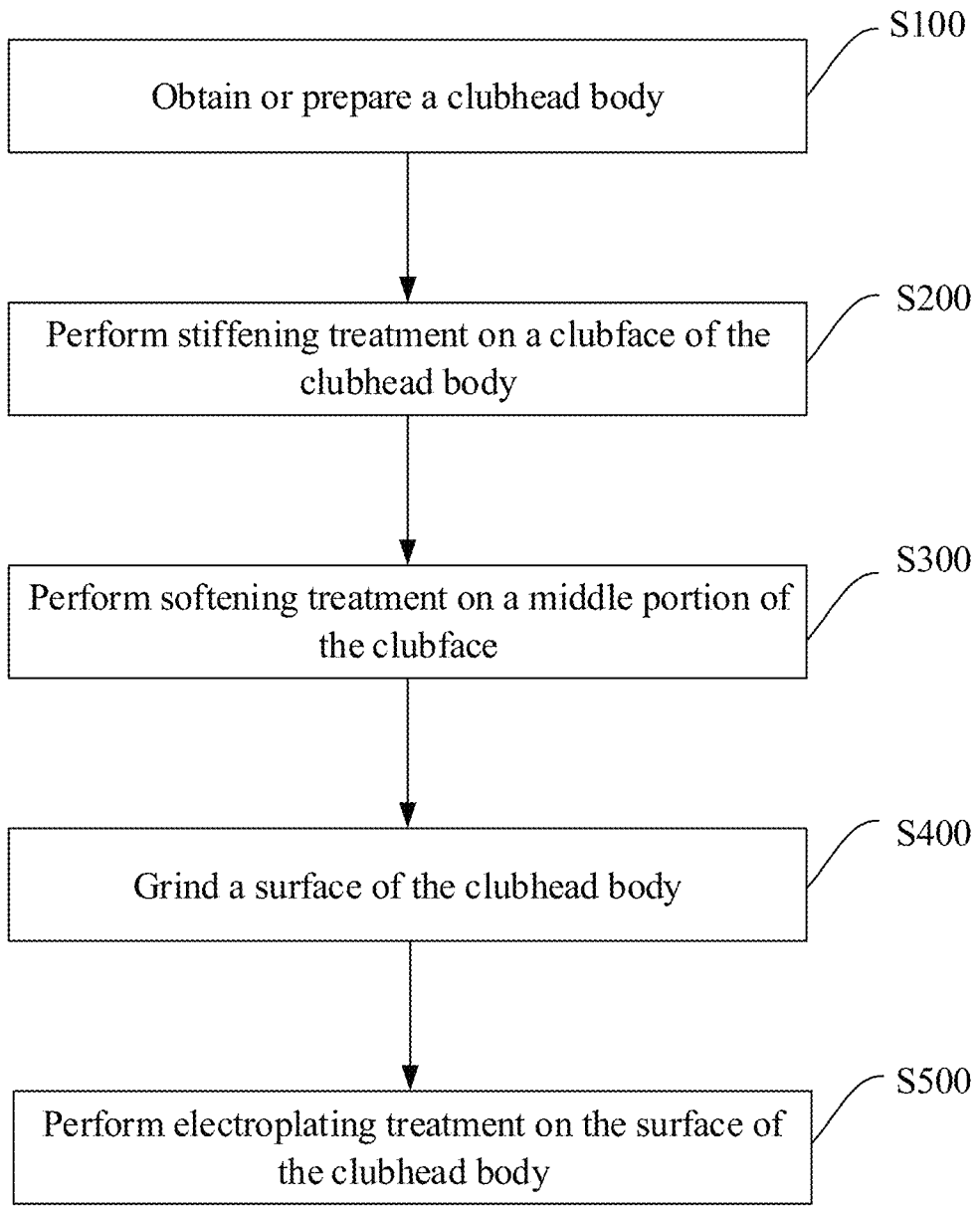
FIG. 1 is a flowchart illustrating a method for manufacturing a golf putter clubhead according to some embodiments provided in a first aspect of the present disclosure.

Reference numerals: clubface 100, toe portion 110, middle portion 120, softening area 121, and heel portion 130.

DETAILED DESCRIPTION

Embodiments of the present disclosure are described in detail below. Examples of the embodiments are illustrated in the accompanying drawings. The same or similar reference signs represent the same or similar elements or elements with the same or similar functions. The embodiments described below with reference to the accompanying drawings are examples and are merely intended to explain the present disclosure, and should not be construed as a limitation on the present disclosure.

In the descriptions of the present disclosure, it should be understood that directions or position relationships indicated by direction-related descriptions such as "up", "down", "left", and "right" are based on directions or position relationships shown by the accompanying drawings, which are used only for describing the present disclosure and for description brevity, but do not indicate or imply that an indicated apparatus or element must have a specific direction or must be constructed and operated in a specific direction. Therefore, this cannot be understood as a limitation on the present disclosure.

In the descriptions of the present disclosure, unless otherwise specifically limited, terms such as "dispose", "mount", and "connect" should be understood in a broad sense. A person skilled in the art can properly determine specific meanings of the foregoing terms in the present disclosure with reference to specific content of the technical solutions.

In the descriptions of the present disclosure, reference terms such as "an embodiment" and "some embodiments" mean that specific features, structures, materials, or characteristics described with reference to the embodiments or examples are included in at least one embodiment or example in the present disclosure. In the present specification, the earlier described example expressions of the terms are not necessarily with respect to the same embodiment or example. In addition, the described specific features, structures, materials, or characteristics can be combined in a proper way in any one or more of the embodiments or examples.

Embodiments of a first aspect of the present disclosure provide a method for manufacturing a golf putter clubhead, including the following steps of S100, S200 and S300:

At S100: Obtain or prepare a clubhead body, where the clubhead body includes a clubface 100, the clubface 100 includes a toe portion 110, a middle portion 120, and a heel portion 130, the toe portion 110 and the heel portion 130 are respectively located at two ends of the clubface 100, and the middle portion 120 is located between the toe portion 110 and the heel portion 130.

At S200: Perform stiffening treatment on the clubface 100.

At S300: Perform softening treatment on the middle portion 120 after the stiffening treatment.

Figure 3:
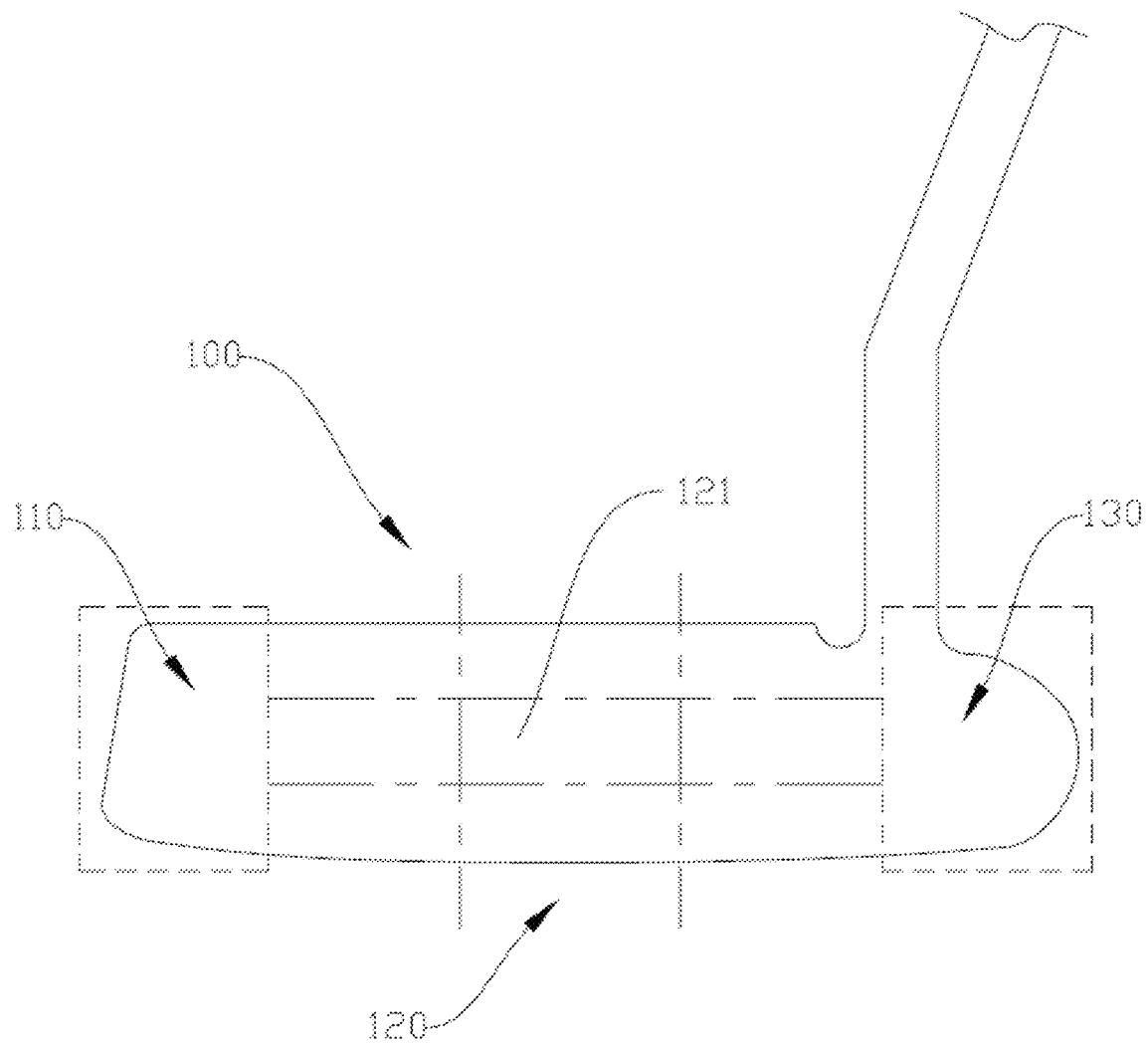
FIG. 3 is a schematic diagram illustrating a golf putter clubhead according to a second aspect of the present disclosure.

For example, as shown in FIG. 1 and FIG. 3, the method for manufacturing the golf putter clubhead includes the following steps: obtaining or preparing a clubhead body, where the clubhead body includes the clubface 100, the clubface 100 includes the toe portion 110, the middle portion 120, and the heel portion 130, the toe portion 110 and the heel portion 130 are respectively located at two ends of the clubface 100, and the middle portion 120 is located between the toe portion 110 and the heel portion 130; performing stiffening treatment on the clubface 100, where a temperature for the stiffening treatment may be set to 860° C. to 880° C., and a time for the stiffening treatment may be set to 90 minutes; and performing softening treatment on the middle portion 120 after the stiffening treatment, where a method for the softening treatment is heating the middle portion 120 by using a high-frequency wave, a heating temperature of the high-frequency wave may be set to 1040° C. to 1060° C., and a heating time of the high-frequency wave may be set to 4 to 6 seconds.

Figure 4:
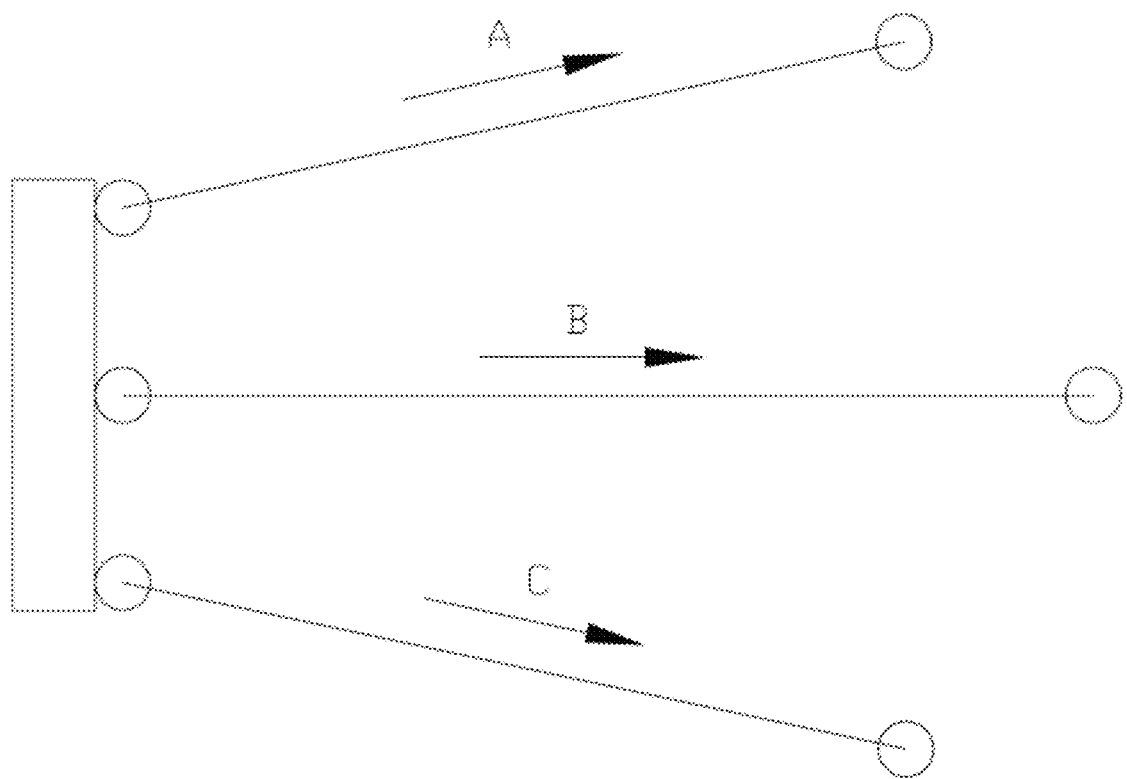
FIG. 4 is a schematic diagram illustrating moving tracks of balls when the balls are hit at different positions of a common golf putter clubhead.
Figure 5:
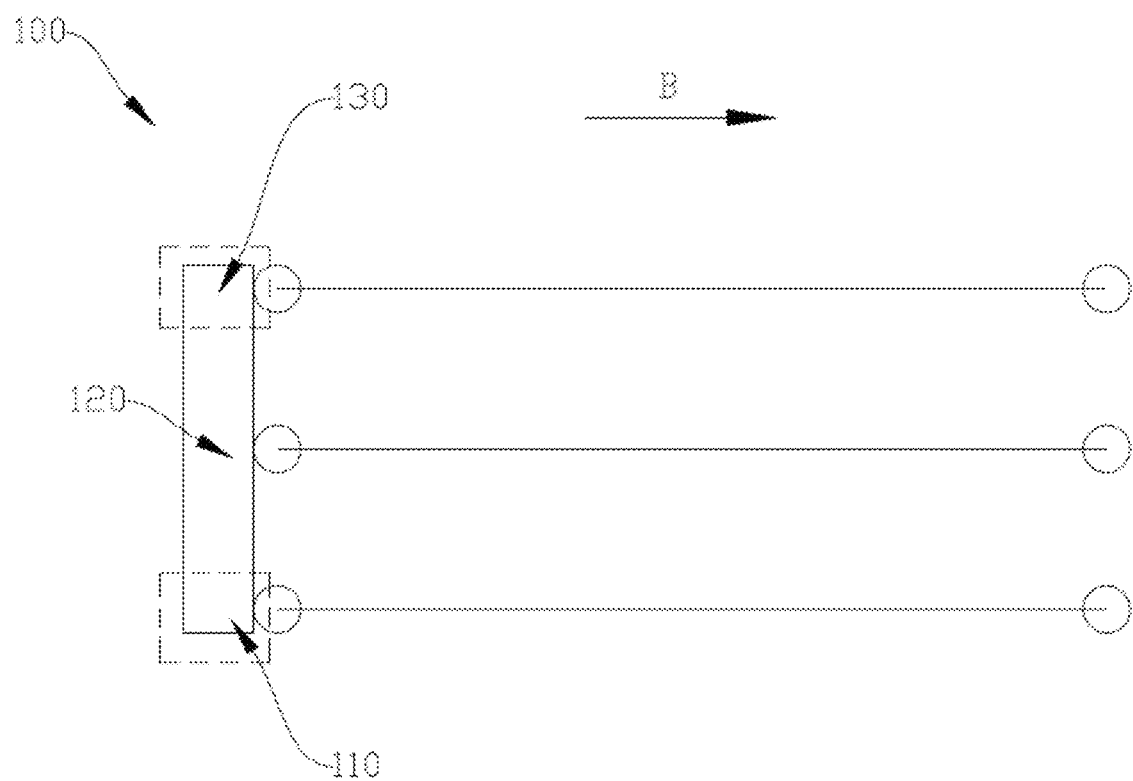
FIG. 5 is a schematic diagram illustrating moving tracks of balls when the balls are hit at different positions of a golf putter clubhead according to some embodiments provided in a second aspect of the present disclosure.

Referring to FIG. 4, a moving direction and a moving distance of a ball vary greatly with a ball hitting position on a clubface of a common putter clubhead. When the ball is hit by a middle portion of the clubface, the ball moves along direction B to a relatively far distance. When the ball is hit by a toe portion of the clubface, the ball moves along direction A. When the ball is hit by a heel portion of the clubface, the ball moves along direction C. Direction A and direction C both deviate from direction B and certain loss of the moving distance occurs. It can be seen that, the common putter clubhead has a relatively high requirement on accuracy of the ball hitting position, any slight deviation may have great impact on a direction and a drop point of the ball, and stability and fault tolerance are low. According to the method for manufacturing the golf putter clubhead provided in the embodiments of the first aspect of the present disclosure, after stiffening treatment is performed on the entire clubhead body, softening treatment is performed on the middle portion 120 of the clubface 100, so that stiffness of the toe portion 110 and the heel portion 130 of the clubface 100 is greater than that of the middle portion 120 thereof. When the toe portion 110 or the heel portion 130 of the clubface 100 hits the ball, the ball tends to move towards the middle portion 120 of the clubface 100. In this case, not all of a driving force over the ball comes from a rebound force generated by an interaction at a contact moment, but comes more from a force generated by swinging the club. That is, a moving track of the ball is affected more by a direction and a force magnitude of swinging the club instead of a direction and a force magnitude of the rebound force at the contact moment. Referring to FIG. 5, when the toe portion 110, the middle portion 120, and the root portion 130 of the clubface 100 hit the ball, the ball moves in direction B, and moving distances are basically the same. The moving direction and moving distance are more stable when the ball is hit, thereby improving stability and fault tolerance for ball hitting.

It can be understood that the stiffening treatment may be performed by using methods such as quenching treatment and nitriding treatment. The temperature and time of the stiffening treatment are not limited to the above embodiments, and may be set based on actual treatment requirements. Different stiffening treatment methods, temperatures, and time may be used for different materials. The softening treatment may be performed by using methods such as annealing treatment and solution treatment. The heating temperature and heating time of the softening treatment are not limited to the above embodiments, and may be set based on actual treatment requirements. Different softening treatment methods, temperatures, and time may be used for different materials and stiffness requirements. A material of the clubhead body may be carbon steel materials such as model S20C/S25C/S35C and stainless steel materials such as model 303/304.

It should be noted that the step of performing softening treatment on the middle portion 120 includes the following steps of S310, S320, S330 and S340:

At S310: Set a plurality of softening areas 121.

At S320: Determine required stiffness for each of the plurality of softening areas 121, so that stiffness gradually increases from the center to the periphery on the clubface 100.

At S330: Set a softening treatment parameter for each of the plurality of softening areas 121 based on the required stiffness.

At S340: Perform softening treatment on each of the plurality of softening areas 121 based on the softening treatment parameter for each of the plurality of softening areas.

Figure 2:
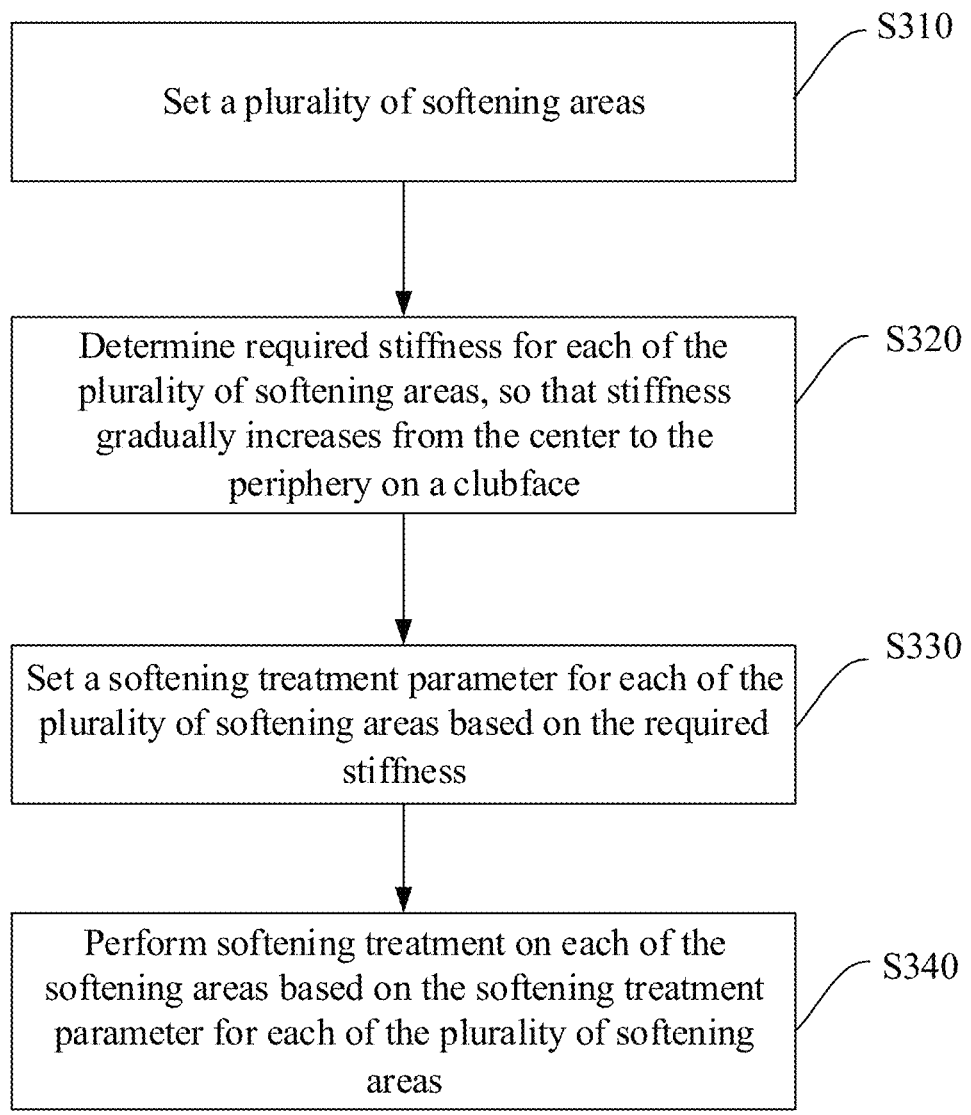
FIG. 2 is a flowchart illustrating step S300 in FIG. 1.

For example, as shown in FIG. 2 and FIG. 3, the step of performing softening treatment on the middle portion 120 includes: setting nine plurality of softening areas 121; determining required stiffness for each of the plurality of softening areas 121, so that stiffness gradually increases from the center to the periphery of the clubface 100; setting a softening treatment parameter for each of the plurality of softening areas 121 based on the required stiffness; and performing softening treatment on each of the plurality of softening areas 121 based on the softening treatment parameter for each of the plurality of softening areas.

To ensure stability of ball hitting by the golf putter clubhead, stiffness gradients from soft to stiff need to be set from the center to the periphery of the clubface 100. As such, when different positions on the periphery of the clubface 100 hit the ball, the ball always tends to move towards the center of the clubface 100. In this case, not all of a driving force over the ball comes from a rebound force generated by an interaction at a contact moment, but comes more from a force generated by swinging the club, thereby making a moving direction and a moving distance more stable when the ball is putted. Dividing the middle portion 120 into the plurality of softening areas 121, and treating the different plurality of softening areas 121 to have different stiffness can ensure more accurate stiffness gradients from the center to the periphery of the clubface 100, thereby further improving stability of ball hitting by the golf putter clubhead.

It can be understood that the number and positions of the plurality of softening areas 121 are not limited to the solution shown in FIG. 3, and may be set based on experimental data and experience. Methods such as experimental data analysis and simulation calculation may be used to design and calculate the required stiffness for different positions at the middle portion 120.

The method for manufacturing the golf putter clubhead may further include the following step of S400:

At S400: Grind the clubface 100.

For example, as shown in FIG. 1, after the softening treatment, grinding the clubface 100 can reduce the roughness of the clubface 100, thereby improving the wear resistance and corrosion resistance of the clubface 100.

It can be understood that equipment such as a grinder or a numerical control machine tool can be used to grind the clubface 100 after the softening treatment or the stiffness treatment. A timing for grinding may be selected based on actual requirements.

The method for manufacturing the golf putter clubhead may further include the following step of S500:

At S500: Perform electroplating treatment on a surface of the clubhead body.

For example, as shown in FIG. 1, performing electroplating treatment on the surface of the clubhead body after the softening treatment can improve the wear resistance and corrosion resistance of the surface of the clubhead body.

It should be noted that the clubhead body is produced through 3D printing.

3D printing can automatically, quickly, directly and accurately convert computer models into entities, and therefore can support manufacture of clubhead bodies in relatively complex shapes with high accuracy, reduced materials, and lower manufacturing costs.

The following describes in detail the method for manufacturing the golf putter clubhead according to the embodiments of the first aspect of the present disclosure by using a complete embodiment. It should be understood that the following description is only an example description, rather than a specific limitation to the present disclosure.

First, the clubhead body is prepared through 3D printing by using a material of S20C carbon steel.

Then, stiffening treatment is performed on the clubface 100 of the clubhead body, where a temperature for the stiffening treatment is 880° C., and a time for the stiffening treatment is 90 minutes. In this way, the overall surface stiffness of the clubhead body is improved.

After the stiffening treatment, nine softening areas 121 are set in the middle portion 120 based on experimental data and experience. Required stiffness for each of the plurality of softening areas 121 is determined by using methods such as an experimental data method and computer-based simulation calculation, so that stiffness gradually increases from the center to the periphery of the clubface 100. A softening treatment parameter is set for each of the plurality of softening areas 121 based on the required stiffness. Softening treatment is performed on each of the plurality of softening areas 121 based on the softening treatment parameter for each of the plurality of softening areas. A high-frequency wave is used to heat each of the plurality of softening areas 121, where a heating temperature of the high-frequency wave is 1040° C. to 1060° C., and a heating time of the high-frequency wave is 4 to 6 seconds.

After the softening treatment is completed, grinding treatment is performed on the clubface 100 by using a numerical control machine tool, and electroplating treatment is performed on the clubhead body.

Embodiments of a second aspect of the present disclosure provide a golf putter clubhead, which is manufactured by using the method for manufacturing the golf putter clubhead according to any one of the foregoing embodiments.

The golf putter clubhead manufactured by using the method for manufacturing the golf putter clubhead provided in the embodiments of the first aspect of the present disclosure enables a moving direction and a moving distance to become more stable when a ball is putted, thereby improving stability and fault tolerance for ball hitting.

Embodiments of a third aspect of the present disclosure provide a golf putter, including the golf putter clubhead according to any one of the foregoing embodiments; and a shaft connected to the golf putter clubhead.

The golf putter manufactured by using the golf putter clubhead that can improve stability and fault tolerance for ball hitting enables improved stability and fault tolerance for ball hitting for the entire golf putter.

The foregoing describes the embodiments of the present disclosure in detail with reference to the accompanying drawings. However, the present disclosure is not limited to the foregoing embodiments. Within the scope of knowledge possessed by a person of ordinary skill in the art, various changes may further be made without departing from the objective of the present disclosure. Moreover, the embodiments in the present disclosure and characteristics in the embodiments may be mutually combined in a case in which they do not conflict with each other.

What is claimed is:

1. A method for manufacturing a golf putter clubhead, comprising the following steps:
    obtaining or preparing a clubhead body, wherein the clubhead body comprises a clubface, the clubface comprises a toe portion, a middle portion, and a heel portion, the toe portion and the heel portion are respectively located at two ends of the clubface, and the middle portion is located between the toe portion and the heel portion;
    performing stiffening treatment on the clubface;
    performing softening treatment on the middle portion after the stiffening treatment; and
    grinding the clubface after the softening treatment, wherein:
    a material of the clubhead body is stainless steel material, and a material on which the stiffening treatment is performed is stainless steel material;
    a temperature for the stiffening treatment is 860° C. to 880° C.;
    a time for the stiffening treatment is 90 minutes; and
    the performing softening treatment on the middle portion comprises:
        setting a plurality of softening areas;
        determining a required stiffness for each of the plurality of softening areas to make the stiffness gradually increase from the center to the periphery on the clubface;
        setting a softening treatment parameter for each of the plurality of softening areas based on the required stiffness; and
        performing softening treatment on each of the plurality of softening areas based on the softening treatment parameter for each of the plurality of softening areas.

2. The method of claim 1, wherein the softening treatment is:
    heating the middle portion by using a high-frequency wave.

3. The method of claim 2, wherein a heating temperature of the high-frequency wave is 1040° C. to 1060° C., and a heating time of the high-frequency wave is 4 to 6 seconds.

4. The method of claim 3, wherein the clubhead body is produced by using a 3D printing method.

5. The method of claim 2, wherein the clubhead body is produced by using a 3D printing method.

6. The method of claim 1, further comprising:
    performing electroplating treatment on a surface of the clubhead body.

7. The method of claim 6, wherein the clubhead body is produced by using a 3D printing method.

8. The method of claim 1, wherein the clubhead body is produced by using a 3D printing method.

9. A golf putter clubhead, wherein the golf putter clubhead is manufactured by using the method of claim 1.

10. A golf putter, comprising:
    the golf putter clubhead of claim 9; and
    a shaft connected to the golf putter clubhead.

* * * * *